Feb. 8, 1938.
A. A. SHOUP
2,107,743
SOUND REPRODUCING AND RECORDING MECHANISM FOR
THE FILMS OF MOTION PICTURE PROJECTORS
Filed June 26, 1936
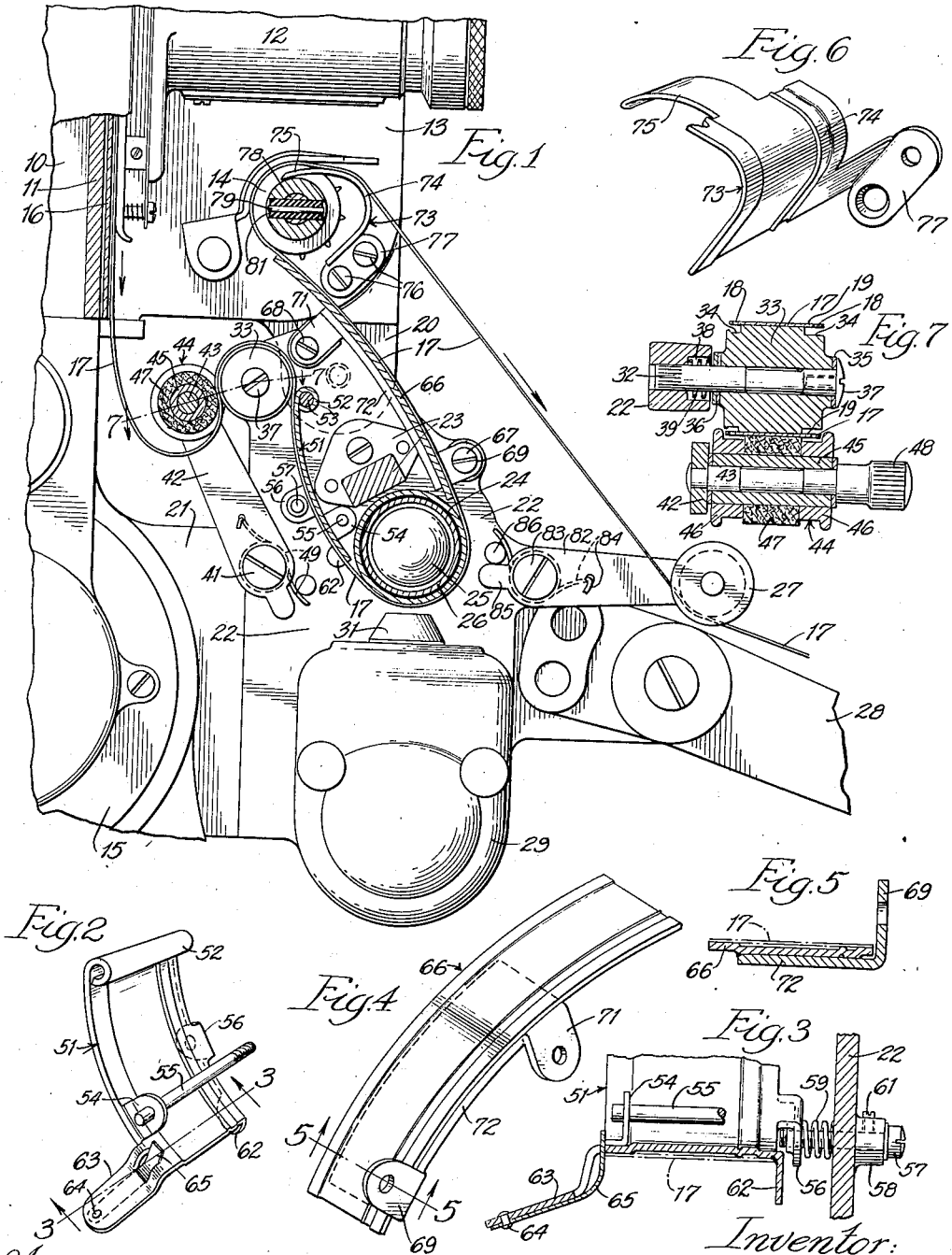
Witnesses:
Inventor:
Allen A. Shoup,
By Fisher, Clapp, Soans & Pond
Attys.

Patented Feb. 8, 1938

2,107,743

UNITED STATES PATENT OFFICE 2,107,743

SOUND REPRODUCING AND RECORDING MECHANISM FOR THE FILMS OF MOTION PICTURE PROJECTORS

Allen A. Shoup, Chicago, Ill., assignor to Universal Stamping & Mfg. Co., Chicago, Ill., a corporation of Illinois Application June 26, 1936, Serial No. 87,437

15 Claims. (Cl. 179—100.3)

This invention relates to the general art of motion picture projectors, and more particularly to sound reproducing machines of that type wherein the film has one or more sound tracks photographically recorded thereon. The improvements forming the subject matter of the present invention are also applicable to machines for photographing a sound track on a sensitized film.

A quite common fault heretofore existing in the performance of the sound reproducing mechanism of motion picture projectors resides in a more or less tremulous or undulating sound effect that is due to variations in the film speed or to minute vibrations of the film as it passes through either the sound track registering mechanism or the sound reproducing mechanism.

The main object of this invention is to eliminate this vibration of the film at and in the vicinity of the sound recording and/or reproducing apparatus so as to improve the quality of the sound, and this object is accomplished mainly by the use of film guide shoes on the entrance and exit sides respectively of the sound recording and/or reproducing means over which the film is drawn under light tension, the tension causing the film to hug the shoes as it travels thereover so that it is not free to vibrate. The film is drawn through the sound recording or reproducing means by a feed sprocket the teeth of which engage holes in the film, and as the film leaves the sprocket at a tangent to a circle in which the bases of the sprocket teeth lie, the teeth, on withdrawing from the holes in the film, spring the film slightly from its tangent line, and thus set up vibrations of the film which may carry back to the zone of the sound recording or reproducing apparatus. To prevent this I preferably employ in association with the film feed sprocket a device in the nature of a film guide shoe that serves to lift the film off the sprocket teeth slightly in advance of the normal tangent line of departure so that separation of the teeth from the film is effected without the teeth imparting any vibration to the film.

An illustrative embodiment of the invention as applied to a sound reproducing mechanism is shown in the accompanying drawing, in which—

Fig. 1 is a fragmentary side elevation, partly in vertical section, of those parts of a motion picture projector to which this invention is applied.

Fig. 2 is a perspective elevation of the film guide shoe on the entrance side of the sound reproducing apparatus, viewed from its inner concave side.

Fig. 3 is a cross section on the line 3—3 of Fig. 2, the position of the film being indicated by dotted lines.

Fig. 4 is a perspective view, similar to Fig. 2, of the film guide shoe on the exit side of the sound reproducing apparatus, viewed from its outer convex side.

Fig. 5 is a cross section on the line 5—5 of Fig. 4, the position of the film being indicated by dotted lines.

Fig. 6 is a perspective view of the film guide shoe that is associated with the feed sprocket for lifting the film clear of the teeth of the sprocket as it leaves the latter.

Fig. 7 is a section, on line 7—7 of Fig. 1, of a film tensioning device that is preferably employed in association with the film guide shoes.

While this invention relates to both recording and reproducing, the accompanying drawing shows a projector and only as much of the sound reproducing mechanism as will be of assistance in apprehending the invention.

In the construction illustrated the casing of the machine, which is only partly shown, includes a lamp compartment 10 having a front wall 11 in which is an aperture (not shown) directly behind the usual adjustable lens mounting 12, and 13 designates the forwardly extending gear box in which is mounted a train of gears for driving the two film sprockets, the lower of which is shown at 14, from a motor partially indicated at 15. Between the inner end of the lens mounting 12 and the wall 11 is formed the film guideway 16. Opposite the lower portion of the film guideway is mounted the usual feeding claw (not shown) for effecting the rapid step-by-step movement of the film 17; this latter having the usual marginal holes 18 for engagement with the sprocket teeth and, just inside one line of holes, a sound track the location of which is indicated at 19 in Fig. 7.

The structure above outlined is substantially identical with that disclosed in patents to Sapier No. 1,780,945, November 11, 1930, and No. 1,816,234, July 28, 1931.

Describing now the sound unit which, except as to certain film guide shoes for preventing vibration of the film later described and claimed herein, forms the subject matter of a copending application of Abraham Shapiro, Serial No. 87,438, filed June 26, 1936, to a lug 20 on the under side of the gear box 13 and to a boss 21 on the frame of the motor 15 is attached a main mounting plate 22, preferably in the form of a casting. In a bracket attached to one side of plate 22 and partly shown at 23 is journaled the shaft of a hollow drum 24 that is open at one end to receive an end portion of a photo-electric cell 25 that is mounted in an insulated brass tube or sleeve 26 itself mounted in and extending crosswise of the mounting plate 22. The film 17, on emerging from the guideway 16, passes first between a pair of tension rolls, later described, thence around substantially the lower half of the drum 24, rotating the latter, thence over the feed sprocket 14, and thence beneath an idler pulley 27 to the take-up reel (not shown) mounted on the free end of an arm 28. The edge portion of the film carrying the sound track overhangs the open end of the drum 24.

Mounted on the plate 22 vertically beneath the axis of the photo-electric cell 25 is a housing 29 containing an exciter lamp (not shown) and a lens 31, whereby a beam of light is directed through the sound track of the film and a slit or narrow slot in the tube 26, onto the cell.

Referring to Figs. 1 and 7, and describing the film tensioning device above referred to, on the upper end of the mounting plate 22 is secured a stud 32 on which is journaled a brass roll 33. The end portions of this roll are annularly countersunk as shown at 34 to avoid contact with the edge portions of the film 17 carrying the sprocket holes and the sound track. On the stud 32 are friction washers 35 and 36 bearing against the ends of the roll 33, and in one end of the stud 32 is a screw 37 the head of which bears on the washer 35 and confines the roller on the stud. In one side of the stud support is a recess 38 to house a light thrust spring 39 that creates friction between the washer 35 and the head of the screw 37, thus creating a light drag on the rotary movement of the roll on its bearing stud. On the mounting place 22 is pivoted by a screw 41 the lower end of an arm 42. In the free upper end of arm 42 is mounted a stud 43 on which is journaled a cooperating roll designated as an entirety by 44. The specific structure of this roll is shown in Fig. 7, wherein it will be seen that the roll comprises a tubular body 45, ends or heads 46, and an annulus 47 of felt or like soft material between the heads 46. The inner portions of the heads 46 are reduced in diameter sufficiently to avoid contact with the edge portions of the film, while the felt sleeve 47 is of sufficient diameter to bear on the front or picture side of the film without marring the latter. In the outer end of stud 43 is a knurled thumb screw 48 that confines the roll on its bearing stud between a pair of washers. The central portions of both studs are slightly reduced, as shown, to receive oil. A spring 49 urges the arm 42 and its roll 44 toward the cooperating roll 33.

Turning now to a description of those features wherein the present invention chiefly resides, 51 designates as an entirety a film guide shoe disposed between the tensioning device last described and the entrance side of the drum 24. This shoe, which is preferably a sheet metal stamping, is longitudinally curved as shown, and its upper end portion is curled inwardly on its concave side to form a transverse eye 52 by which it is suspended from a stud 53 in the plate 22. Just inwardly of the edge thereof that is remote from the plate 22 is an ear 54 that is apertured to receive and have a sliding engagement with a stud 55 projecting from the plate 22. On the opposite edge of the shoe is an oppositely projecting ear 56 containing a threaded hole engaged by an adjusting screw 57 rotatably mounted in the wall 22 and a boss 58 on the side of the latter. Encircling the screw between the ear 56 and the adjacent side of the plate 22 is a thrust spring 59, and 61 is a set screw in the boss 58 to lock the adjusting screw 57 against accidental turning. On the inner edge of the lower end of the shoe is a depending guide lug 62, and on the opposite edge is a slotted arm 63 to the outer end of which is attached, as by a rivet 64, a light leaf spring 65 the free end portion of which extends through the slot of the arm and bears on one edge of the film. The film is thus confined edgewise between the two guides 62 and 65, and the purpose of making the guide 65 yieldable is to automatically compensate for any slight lack of uniformity in the width of the film or of different films. The purpose of the adjusting screw 57 is to adjust the lower end of the shoe edgewise so that the sound track on the film will be in exact register with the slit or slot through which the light beam passes onto the photo-electric cell and the film cannot shift edgewise on the rotating drum 24 which might partly or entirely occlude the sound track. It will be observed that the upper end of shoe 51 extends up to a point opposite the exit side of the roll 33 so that as one surface of the film leaves the roll the other comes into contact with the shoe, and this prevents any fluctuation or vibration of the film as it leaves roll 33.

Between the exit side of the drum 24 and the feed sprocket 14 is a shoe 66 generally similar to the shoe 51, that is attached to plate 22 by screws 67 and 68 passing through oppositely offset ears 69 and 71 respectively on the inner edge of the shoe. To reinforce and stiffen the shoe the ears 69 and 71 are preferably formed on a plate 72 that is spot-welded onto the concave side of the shoe. It will be observed that the film travels over the convex sides of both shoes 51 and 66 and intermediate portions of said convex sides are countersunk, so that only the longitudinal marginal portions of the film outside the picture and sound track records contact the shoes thus avoiding any rub and wear on the picture and sound track portion of the film. It will also be observed that the upper end of shoe 66 extends up to the path of the teeth of feed sprocket 14, so that any fluctuation of the film as the teeth enter the holes of the film is prevented.

By the tensioning device, the film is maintained in sliding contact with the stationary shoes 51 and 66, and this contact prevents any lateral vibration of the film as the latter travels into, through and beyond the sound reproducing device.

Cooperating with the film feed sprocket 14 is a device designed to prevent vibration of the film as the latter leaves the sprocket due to the pull of the teeth on the film as the teeth emerge from the holes of the film.

This preferably consists of a shoe designated as an entirety by 73 and shown in isolated detail in Fig. 6. This shoe underlies the film and is formed with a hump 74 that extends beyond the path of the sprocket teeth, and with a narrowed tongue or stripper 75 that overhangs the central reduced portion of the sprocket 14 as shown in Fig. 1. This shoe is attached to the gear box 13 by screws 76 passing through an attaching bracket 77 on one edge of the shoe. As the film leaves the sprocket 14 it is raised, thus lifting the holes of the film clear of the teeth before the latter withdraw from the holes and so avoiding any vibration or fluctuation of the film at this point. The use of the shoe 73 is optional, but it is preferably employed in connection with the shoes 51 and 66 to secure complete elimination of all vibration or fluctuation of the film as it enters and leaves the sound reproducing mechanism.

Fig. 1 illustrates two improvements, additional to those already described which further conduce to uniform or constant film speed and freedom from film unsteadiness. The feed sprocket 14 is coupled to its drive shaft 78 by means of a pin 79 encircled by a rubber sleeve or envelope 81, the pin and its elastic sleeve being fitted into registering transverse holes in the body of the sprocket and the drive shaft, as shown. By this flexible coupling minute variations in the speed of the drive shaft are absorbed by the cushion sleeve 81 and the smooth constant speed travel of the film is maintained.

The idler pulley 27, before referred to, is journaled on the free end of an arm 82 that at its other end is mounted on a pivot stud 83 in the plate 22; the arm and pulley being urged downwardly to maintain a light tension on the film passing to the take-up reel by a spring 84. A tail piece 85 on the arm 82 cooperates with a pin 86 in the plate 22 to limit the down swing of the arm and pulley. The pulley 27 thus prevents sudden jerks on the film due to the action of the take-up reel. If a big jerk occurs, as when starting the reel, the spring allows the pulley to rise and thus prevent excessive strain on the film such as might break the latter.

Although but one specific embodiment of this invention has been herein shown and described, it will be understood that specific changes in the structural details and arrangements of the device may be resorted to within the scope of the invention as defined in the following claims. And while I have shown and described the invention as applied to a sound reproducing apparatus, its applicability to and utility in, a recording apparatus, whether sound or picture, will be apparent to all persons skilled in the art; and since a sound reproducing apparatus operating on a developed film and a camera for recording a picture or a sound track or both on a sensitized film are both reproducing instrumentalities, I have, in the appended claims, employed the term "reproducing means" to cover and include both.

I claim:

1. In a machine of the class described, the combination with a film, and reproducing means through which said film travels, of a film guide shoe mounted on the entrance side of said reproducing means over which the film travels, guides on the side edges of said shoe for engaging the edges of the film, and means independent of said shoe for maintaining sliding contact of the film on said shoe.

2. In a machine of the class described, the combination with a film, and reproducing means through which said film travels, of a stationary film guide shoe mounted on the entrance side of said reproducing means over which the film travels, guides on the side edges of said shoe for engaging the edges of the film, means independent of said shoe for maintaining sliding contact of the film on said shoe, and means for effecting edgewise adjustment of said shoe.

3. In a machine of the class described, the combination with a film, and reproducing means through which said film travels, of independent stationary film guides on the entrance and exit sides respectively of said reproducing means over which the film slides, said guides serving to prevent vibration of the film as it travels through said reproducing means.

4. In a machine of the class described, the combination with a film, and reproducing means through which said film travels, of independent stationary film guides on the entrance and exit sides respectively of said reproducing means over which the film slides, said guides serving to prevent vibration of the film as it travels through said reproducing means, and means independent of said guides for creating a tension on the film as it travels over said guides.

5. In a machine of the class described, the combination with a film, and reproducing means through which said film travels, of independent film guide shoes on the entrance and exit sides respectively of said reproducing means over which the film travels, said shoes engaging only the longitudinal marginal portions of the film outside the record portion thereof.

6. In a machine of the class described, the combination with a film, and reproducing means through which said film travels, of independent film guide shoes on the entrance and exit sides respectively of said reproducing means over which the film travels, said shoes engaging only the longitudinal marginal portions of the film outside the record portion thereof, and means independent of said shoes for creating a tension on the film as it travels over said shoes.

7. In a machine of the class described, the combination with a film, and reproducing means through which said film travels, of longitudinally curved film guide shoes on the entrance and exit sides respectively of said reproducing means over the convex sides of which the film travels, said convex sides being so shaped as to engage only the longitudinal marginal portions of the film outside the record portion thereof.

8. In a machine of the class described, the combination with a film, and reproducing means through which said film travels, of a film tensioning device, and a film guide shoe extending the full distance between said tensioning device and the entrance side of said reproducing means over which the film travels in sliding contact therewith.

9. In a machine of the class described, the combination with a film, and reproducing means through which said film travels, of a film feed sprocket, and a film guide shoe extending the full distance between the exit side of said reproducing means and said sprocket over which the film travels in sliding contact therewith.

10. In a machine of the class described, the combination with a film, and reproducing means through which said film travels, of a film tensioning device, a longitudinally curved film guide shoe extending the full distance between said tensioning device and the entrance side of said reproducing means, a film feed sprocket, and a longitudinally curved film guide shoe extending the full distance between the exit side of said reproducing means and said sprocket, said film traveling over the convex sides of both of said shoes.

11. In a machine of the class described, the combination with a film, and reproducing means, of a sprocket wheel for drawing the film through said reproducing means, and means associated with said sprocket wheel acting to raise the film off the teeth of the sprocket wheel at a point in advance of the normal tangent line of the departing portion of the film to the periphery of the sprocket wheel.

12. In a machine of the class described, the combination with a film, and reproducing means, of a sprocket wheel for drawing the film through said reproducing means, and a film guide shoe mounted opposite the exit side of the sprocket wheel and under the film, said shoe formed with a hump projecting beyond the periphery of the sprocket teeth and acting to raise the film off said teeth.

13. In a machine of the class described, the combination with a film, and reproducing means, of a wheel for drawing the film through said reproducing means, and a film guide shoe mounted adjacent the exit side of the wheel and under the film, said shoe formed with a curved hump projecting beyond the periphery of the wheel and with a tongue continuous with said hump, said tongue and hump acting to raise the film clear of said wheel as the film leaves said wheel.

14. In a machine of the class described, the combination with a film, reproducing means, and a sprocket wheel operating to draw the film through said reproducing means, of means for preventing vibration of the film as it travels through said reproducing means, comprising film guide shoes on the entrance and exit sides respectively of said reproducing means over and in contact with which the film travels, a film guide shoe mounted adjacent the exit side of said sprocket wheel beneath the film and operating to separate the film from the sprocket teeth as the film leaves said wheel, and means for creating a tension on the film as it travels over said guide shoes.

15. In a machine of the class described, the combination with a film, and reproducing means through which said film travels, of a film guide shoe mounted on the entrance side of said reproducing means over which the film travels, guides on the side edges of said shoe for engaging the edges of the film, means for adjusting said shoe edgewise relatively to said reproducing means, and means for maintaining sliding contact of the film on said shoe.

ALLEN A. SHOUP.